Jan. 12, 1954
C. A. BLAKESLEE ET AL
CLOUD-DATA RECORDER
2,665,607
Filed July 21, 1945
3 Sheets-Sheet 1
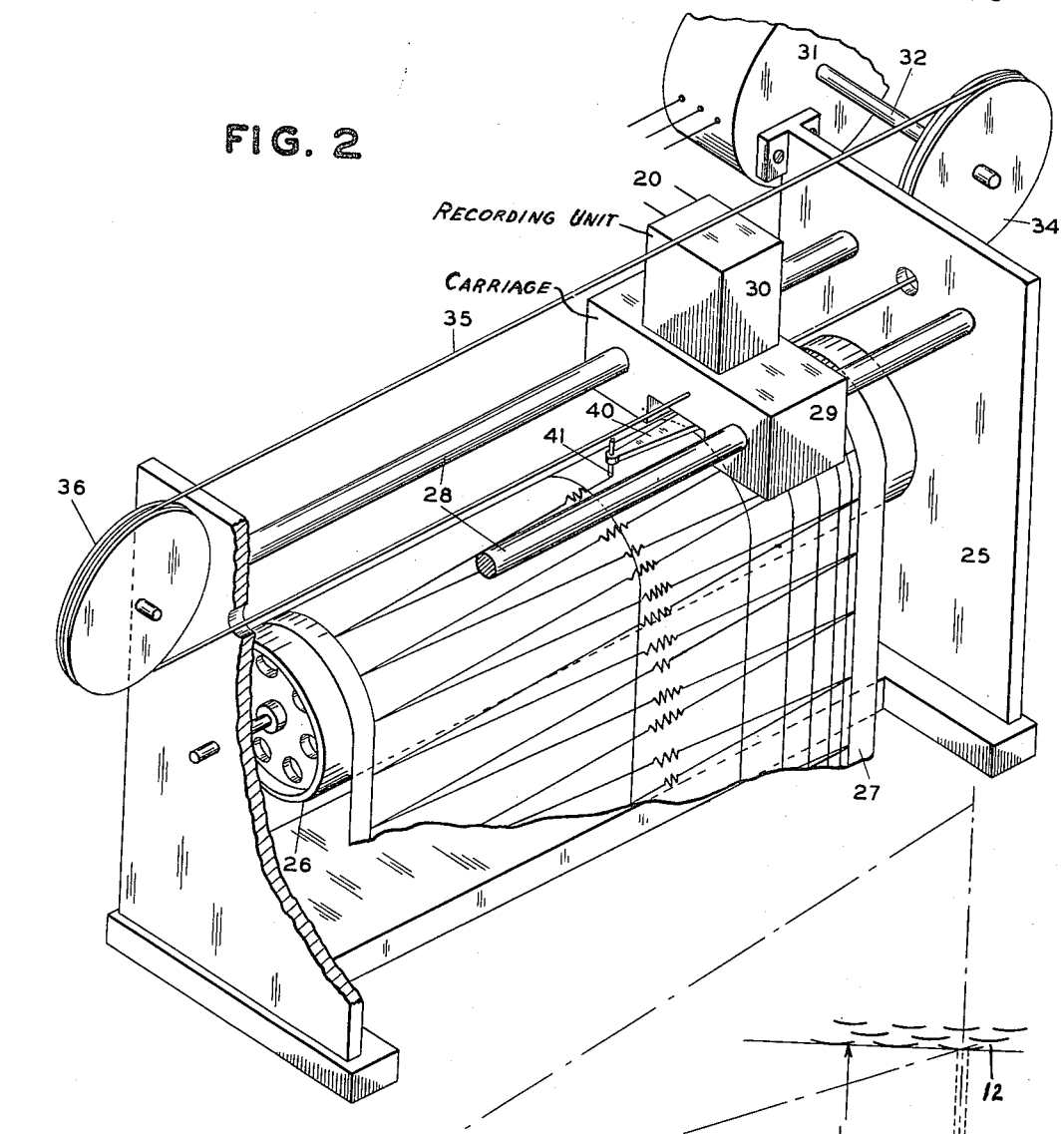
INVENTORS
CLINTON A. BLAKESLEE
BY ABRAHAM W. JACOBSON
E. C. Sanborn
ATTORNEY Jan. 12, 1954

C. A. BLAKESLEE ET AL 2,665,607

CLOUD-DATA RECORDER

Filed July 21, 1945

INVENTORS
CLINTON A. BLAKESLEE
BY ABRAHAM W. JACOBSON

E. C. Sanborn

ATTORNEY

Jan. 12, 1954  C. A. BLAKESLEE ET AL  2,665,607
CLOUD-DATA RECORDER

Filed July 21, 1945  3 Sheets-Sheet 3

INVENTORS
CLINTON A. BLAKESLEE
ABRAHAM W. JACOBSON
BY
E. C. Sanborn
ATTORNEY

Patented Jan. 12, 1954

2,665,607

UNITED STATES PATENT OFFICE 2,665,607

CLOUD-DATA RECORDER

Clinton A. Blakeslee, Middlebury, and Abraham Walter Jacobson, New Haven, Conn., assignors to The Bristol Company, Waterbury, Conn., a corporation of Connecticut Application July 21, 1945, Serial No. 606,440

11 Claims. (Cl. 88—14)

This invention relates to apparatus for recording the distance and density of a light-reflective mass from a chosen fixed point, and more especially to means for providing a record of the height and density of cloud ceiling over a selected point.

In determining ceiling levels, various applications of triangulation principles have been made, these generally involving either the use of two light sources spaced a known distance apart of the earth's surface and simultaneously directed upon a common visible point of the cloud surface, or the utilization of a beam of light projected from a single source and having its position of interception by the cloud surface determined by the response of a light-sensitive cell. No invention is herein claimed for either of these basic principles; and the present invention may be said to fall into the latter of the two classes.

It is an object of the present invention to provide a graphic and readily readable record of ceiling height variations over an extended period of time.

It is a further object to provide means of the above nature which shall incorporate in the record a measure of the opacity or density of the vapor or cloud mass whose height is under determination.

It is a further object to provide means of the above nature which shall provide a continuous record of haze or mist density from the surface of the earth to the highest level within its range.

In carrying out the purposes of the invention, it is proposed to utilize a triangulation principle wherein a vertically projected light beam of periodically modulated intensity has its path cyclically scanned by a light-sensitive device, and to provide in conjunction with apparatus for effecting said scanning a recording instrument responsive chronographically to the time of interception of the cloud ceiling by the scanning means and also quantitatively to the reflecting properties of the cloud surface. For a discussion of the general principle of ceiling determination by means of a light beam and associated photoelectric apparatus, reference may be had to the following two published papers (1) Middleton, W. E. K.: On the theory of ceiling projector: Journ. Opt. Soc. Amer., vol. 29 (1939) page 340; and (2) Laufer, M. K. and Foskett, L. W.: The daytime photoelectric measurement of cloud heights: Journ. Aero. Sciences, vol. 8 (1941) page 183.

In the drawings:

Fig. 1 is a diagram of the system and apparatus to which the invention is especially applicable, including a geometric representation of involved magnitudes.

Fig. 2 is a perspective view of a recording instrument incorporating the principles of the invention.

Figure 3:
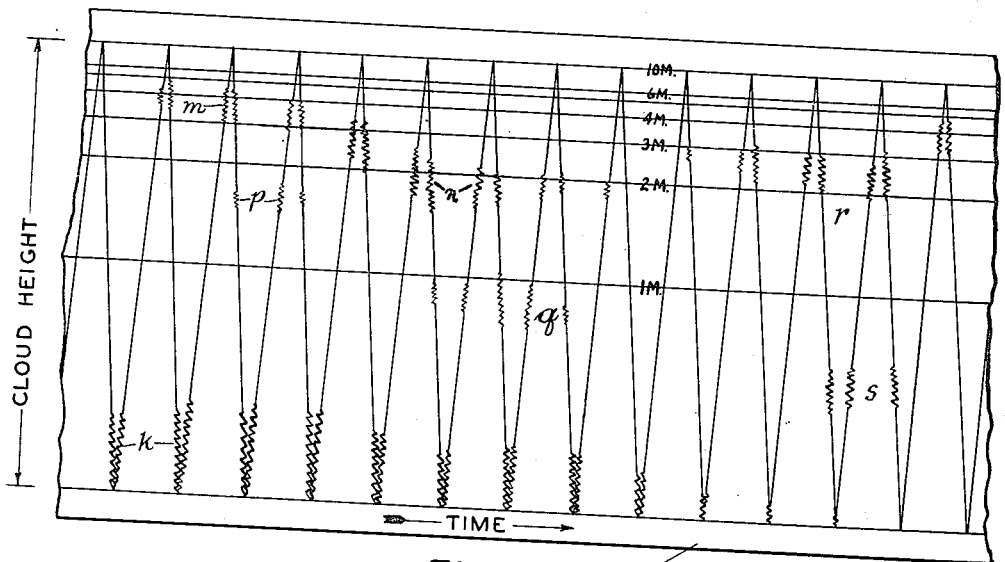
Fig. 3 is a representation of a typical chart obtained from the instrument shown in Fig. 2, when applied to the purposes of the invention.

Referring now to the drawings, and more especially to Fig. 1, the numeral 10 designates a light projector adapted to project vertically upward a beam of substantially parallel rays of light to be intercepted by a cloud or vapor surface and to illuminate the same. The light source may expediently consist of a high-intensity mercury arc located at the focus of a suitable parabolic reflector having its optical axis disposed in a vertical line. When such a lamp is operated on alternating current the light intensity undergoes a very high percentage modulation at a frequency double that of the current. The light source is energized from a conventional 60 cycle source 11, whereby the beam of light will be modulated in intensity at a frequency of 120 cycles per second. The lower cloud surface or ceiling 12, vertically above the projector 10 will be illuminated by the modulated light; whereby may be actuated photo-sensitive apparatus selectively responsive to the frequency of modulation.

At a known horizontal distance $d$ (e. g. 1,000 feet) from the projector 10 is positioned a receiving apparatus comprising a scanning device which includes a housing 15 having therein an optical system and a photocell, and adapted to be oscillated about a horizontal axis on a pedestal 16 whereby the optical axis of the system may sweep through a limited angle $a$ in a vertical plane containing the light beam emanating from the projector 10, causing pulsating light deflected from said beam at a point intersected by said optical axis to be picked up by said photocell and to energize the same with a frequency corresponding to that of the pulsations. Oscillation of the housing 15 is effected by a reversible motor 17 adapted to run alternately in opposite directions at a constant speed, and quickly reverse as the housing reaches each of its extreme positions. The optical axis or "line of sight" of the photocell is thus caused to sweep periodically from a horizontal direction, where it will intersect the projected light beam perpendicularly, to a predetermined upward deflection, as indicated by the angle $a$, and intersecting the light beam at a predetermined vertical distance $h$ above the axis of oscillation, which distance may be made to correspond with the maximum ceiling (e. g. 10,000 feet), which it is desired to measure.

The photocell within the oscillatable housing 15 is connected through a circuit including suitable flexible leads 18 to an amplifier 19 adapted to receive and amplify impulses having the frequency of the light source (120 cycles and to be insensitive to all other frequencies, including steady light. An amplifier suitable for this purpose is fully described in the above-referred-to paper by Laufer and Foskett, and forms no part of the present invention. The output of the amplifier 19, consisting of an alternating voltage of intensity varying with that of illumination received by the photocell, and of a frequency corresponding to that of modulation of the light source in the projector 10, is applied through suitable conductors 20 to a recording instrument 21, presently to be described in detail. Mounted upon the pedestal 16 is a telemetering transmitter 22, which may expediently take the form of a position motor (commonly known by the name of "Selsyn"), said motor having its moving part connected to the mechanism of the oscillatable housing 15 by a link 23, whereby the position of said part will at all times be representative of the vertical displacement of the optical axis of said housing.

The recording instrument by which the impulses developed in the photocell are translated into terms of cloud height and density is shown in detail in Fig. 2. Journalled within a supporting frame 25 is a drum or roller 26 adapted to be rotatably advanced at a constant velocity by means of a clock or equivalent timing motor not shown in the drawing. Carried by the drum 26 and adapted to be advanced thereby is a continuous record sheet or chart 27. Mounted upon a track 28 forming a part of the frame 25 is a translatable carriage 29, slightly above the drum 26, and adapted for motion in a sense parallel to the axis thereof, and carrying a recording unit 30, presently to be described. Fixed to the frame 25 is a position motor receiver 31 having a movable shaft 32, and adapted, when connected to the transmitter 22 by a suitable electric circuit, to cooperate with the same in angularly positioning said shaft in correspondence with the angular position of the oscillatable housing 15. Attached to the shaft 32 is a sheave or pulley 34; and a cord or belt 35 stretched therefrom to a similar sheave 36 and extending parallel to the track 28, is attached to the carriage 29, providing means whereby said carriage will be positioned along its track to correspond with the rotated position of the shaft 32, and therefore with the angular position of the housing 15.

The recording element 30, mounted upon the carriage 29 is provided with an arm 40 deflectable through a limited but variable angle about a vertical axis perpendicular to the line of travel of said carriage, and carrying a pen or stylus 41 adapted to inscribe on the chart 27 a graph having a principal component representing the periodic translation of the carriage 29 transversely of said chart, and a secondary component representing the angular deflection of the arm 40 about its axis, and exhibited as a deviation, substantially perpendicular to the direction of said translation, of said graph from a straight line between points at opposite extremes of the transit of said chart by said stylus. The conductors 20 carrying the output of the amplifier 19 are connected to the recording element 30; and the manner of translation of potential variations between said conductors into proportional displacements of the arm 40 may be according to any one of a number of well-known expedients, of which four are exemplified in Figs. 4, 5, 6 and 7, respectively.

Figure 4:
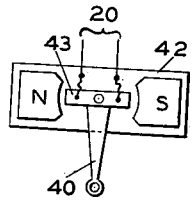
Figs. 4, 5, 6 and 7 are representations of alternative forms of a responsive element forming a part of said recording instrument.

In Fig. 4 is indicated a conventional instrument movement 42 having permanent magnet poles N and S, between which is pivoted for limited angular deflection a coil 43, carrying the arm 40. The conductors 20 being connected to the coil 43 through flexible leads, which may also serve as control springs, the coil 43 and the arm 40 will be deflected in response to, and in proportion to, the potential applied between the conductors 20. By suitably selecting the inertia and damping characteristics of the movement 42, its operation may be made substantially critical for the frequency involved, or resonant thereto if desired, whereby the stylus 41, carried by the arm 40, and partaking simultaneously of the oscillatory motion derived from the applied alternating potential, and of the translatory motion of the carriage 29 with respect to the chart 27, will inscribe on said chart a record which will be a substantial oscillogram of said potential.

Figure 5:
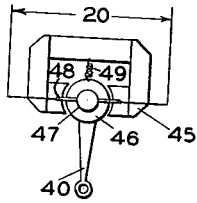

In Fig. 5 is shown an alternative form of electromagnetic recording element developed from a miniature direct-current motor, such as is commerciably available for use in model railroad construction. Rotatively supported between the poles of a permanent magnet 45 is an armature 46 having a conventional commutator 47 and brushes 48, to which are connected the conductors 20. A spring 49 extended between suitable points on the armature and the magnet structure serves to maintain the former in a neutral position from which it will be angularly deflected in response to potentials applied between the conductors 20. The recording arm 40 is attached to the shaft of the armature 46, and, as in the form of element shown in Fig. 4, may be caused to partake of an oscillatory motion representative of variations in said potential. It will be obvious that, because of the limited angle of deflection of the armature 46, the commutator and brushes may be replaced by suitably connected flexible leads, when this form of element becomes substantially equivalent to that shown in Fig. 4; but because of the high torque of the type of motor referred to, in proportion to the inertia of its moving part, this form of recording element has been found eminently suited to the purposes of the invention.

Figure 6:
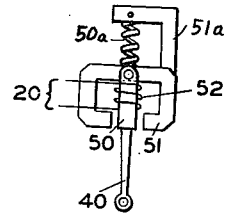

A further alternative form of electromagnetic recorder is shown in Fig. 6, wherein an oscillatable armature 50 of ferromagnetic material carrying the arm 40 is pivotally mounted in the field of a permanent magnet 51 and is surrounded by a stationary coil 52 to the terminals of which are connected the conductors 20. The armature 50 is normally maintained in a neutral position between the poles of the magnet 51 by spring means 50a extended between a suitable point on said armature and an abutment member 51a fixed to the magnet 51, and will be deflected toward one or other of said poles according to the direction of current in the coil 52, and to an extent depending upon the intensity of said current. The arm 40 will thus partake of the motion of the armature 50, and will cause the stylus 41, as in the previously described embodiments of the recording element, to inscribe on the chart a record suitable to the purposes of the invention.

Figure 7:
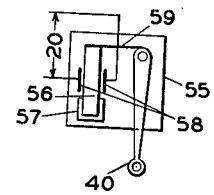

In Fig. 7 is shown a recording element utilizing the piezo-electric effect, whereby variations in electrical potential are directly translated into corresponding mechanical displacements without the interposition of a complete electrical circuit or any magnetic or corresponding instrumentalities. Mounted upon a base plate 55 adapted to be incorporated in the recording unit 30 shown in Fig. 1, is a piezo-electric crystal 56 of the bending type, secured at one edge as by a support 57 and having a displaced portion adapted to deflect in response to electro-motive forces suitably applied to the opposed faces of the crystal. Electrodes or plates 58, to which are connected the conductors 20 provide means for applying to the faces of the crystal the variable potential represented by the output of the amplifier 19. The recording arm 40 is pivotally mounted upon the base 55 and connected to the deflecting portion of the crystal 56 by means of a suitable link 59, whereby displacements of the free portion of said crystal will be suitably magnified and communicated to said arm to produce corresponding deflections of the same. A mechanism suited to the purposes of the invention, and corresponding generally to that shown in Fig. 7, is fully set forth and described in U. S. Letters Patent No. 2,149,216 issued to C. K. Gravley February 28, 1939.

The characteristics of the record produced by the instrument will be understood by reference to Fig. 3 wherein is shown a section of a typical chart record obtainable from the device under operating conditions. If the chart 27 be advanced at a uniform velocity, and the carriage 29 progressively translated back and forth across the chart, it will be seen that the pen or stylus 41, if not subjected to oscillatory action, will trace evenly spaced zigzag lines extending from one side of the chart to the other. If an alternating potential is developed between the conductors 20 and applied to the movement of the recording element 30, the arm 40 will oscillate to an extent depending upon the magnitude of said potential, and, if energized from a 120-cycle source, as hereinbefore set forth, will superimpose upon said zigzag line a jagged portion, constituting a ripple; and the location of said ripple with respect to the terminal points of the zigzag line will become a measure of the angle of deflection of the scanning device at the time the impulse was received, and hence of the height of the reflecting surface of the cloud layer intercepting the vertically projected beam of light. Moreover, since the amplitude of the superimposed ripple is a measure of the output potential of the amplifier 19, applied to the recording element 30 by means of the conductors 20, it will be a measure of the intensity of illumination upon the photocell in the housing 15. Since the reflecting power of the mass of vapor upon which the light beam is directed is related to its density, it follows that, while the position of the ripple along the line of travel of the recorder carriage becomes an indication of the height of the cloud surface, the width of the ripple in a sense perpendicular to said line will provide a measure of the cloud density.

It will be obvious that in the mechanism as thus far described, the periodic displacement of the carriage 29 with respect to the chart 27 will be directly proportional to the angle of deflection of the scanning mechanism including the housing 15 whose optical axis is directed at various points along the beam of light emanating from the projector 10. Since said angular displacement is not directly proportional to, but is a trigonometric function of, the height $h$ in Fig. 1, it will be apparent that the scale proportionality of the record on the chart 27 will not be uniform, and that the trigonometric law governing the relationship between height and angular deflection of the scanning device will appear in the record.

The scale proportionality of the chart in Fig. 3 is that which would be obtained with the apparatus set up to a base line of 1000 feet between the projector and the receiving apparatus, and having the scanning device sweeping through a vertical angle $a$ corresponding to a ceiling height of $h$ feet. The ceiling height in feet would then be expressed by the formula:

$$h = 1000 \tan a$$

With these proportions, the scale will obviously be very open in its lower portion and correspondingly cramped in its upper ranges. Means for rectifying this characteristic will presently be described.

Analyzing the chart shown in Fig. 3 it will be noted that at the beginning of the period represented by the specimen record, the scanning device, while directed toward the lower portion of the vertically projected beam, picks up an oscillation $k$, traceable to ground haze, a common phenomenon in this class of work. The fact that no oscillations are received when the scanner is directed toward the upper part of its range shows that the projected beam light is intercepted by no cloud surface, and that no ceiling exists, below the 10,000-foot range to which the apparatus is calibrated. A short time after the start of the run, oscillations appear in the upper part of the graph, as at $m$, indicating that a cloudiness is developing at about the 4000-foot level; and the increasing amplitude of the oscillations indicates that this cloudiness is of correspondingly increasing density. With the passage of time the ceiling descends to a lower level until at $n$ it has reached the level of 2000 feet, after which it drops rather rapidly to approximately 1500 feet, then rises, becomes of less intensity, and shortly disappears. At $p$ and $q$ are indications due to the presence of isolated clouds below the ceiling, the latter being of relatively dense structure. It will be noted further that the ground haze, as generally indicated at $k$, has been progressively growing less, until it finally becomes imperceptible. After a short interval of practically clear sky, a ceiling reappears slightly below the 3000-foot level, as indicated at $r$; and this increases somewhat in intensity, after which it rapidly rises as shown shortly before the termination of the record. At the same time, as indicated at $s$, a small isolated cloud at a level of less than 1000 feet enters and leaves the range of the apparatus.

Figure 8:
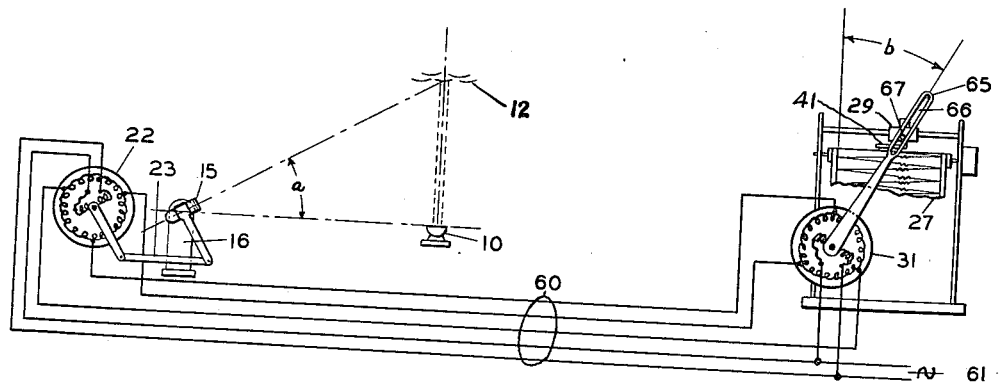
Fig. 8 is a representation of means by which a uniformly proportioned chart scale may be obtained when so desired.

While in many instances the scale proportionality involving the trigonometric law may be acceptable, in others, it becomes desirable that the record appear on a uniformly divided scale. In the latter case, compensation for non-linearity may readily be effected by any one of a number of well known methods for modifying the proportionality of instrument scales. One such method, especially suited to condition attending the present invention, is shown in Fig. 8 of the drawings. The scanning device 15 is shown mounted for angular deflection about a horizontal axis on the pedestal 16, and connected by means of a link 23 to the telemetering transmitter 22 of the position motor class, all these elements being as hereinbefore disclosed and explained in connection with Fig. 1. The position motor receiving element 31 is shown as mounted upon the receiving instrument 21, and connected to the transmitter 22 by means of a circuit 60, which is of the conventional type used for such telemetering systems, wherein the position motors have similar polyphase windings interconnected by three separate conductors, and the rotor of each of said motors has a single phase winding, said windings being connected in parallel and energized from a common alternating current source 61.

Instead of the receiving motor 31 being connected to the carriage 29 in the manner shown in Fig. 2, wherein the displacement of said carriage laterally of the chart 27 will be directly proportional to the angular deflection of the moving part of said motor, there is interposed between the receiving motor and the carriage a compensating geometric linkage providing a configuration at all times similar to the triangle formed by the vertically projected light beam, the base line, and the optical axis of the scanning device. Extending from the motor 31 is an arm 65, rotatable with the rotor or armature of said motor through a limited angle about an axis which perpendicularly intersects the plane of the chart on its zero line, and having a radially disposed slot 66 adapted to engage a cooperating pin 67 on the carriage 29, whereby with angular displacement of the arm 65 the carriage 29 will be correspondingly translated along the track 28. The arm 65 is operatively attached to the rotor of the position motor 31 in such a manner as at all times to make with the zero line of the chart an angle $b$ equal to the angle $a$ of deflection of the scanning device axis from the horizontal, whence, from the similarity of triangles, it will be apparent that the displacement of the carriage 29 from the zero of reference will be proportional to the distance $h$ in Fig. 1, giving a uniformly divided height scale on the chart 27.

Figure 9:
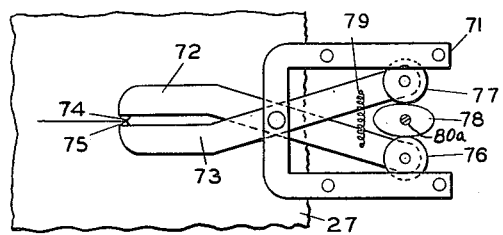
Figs. 9 and 10 are top and side elevations respectively of an alternative form of recording element, Fig. 9 being a section taken on line A—A in Fig. 10.
Figure 11:
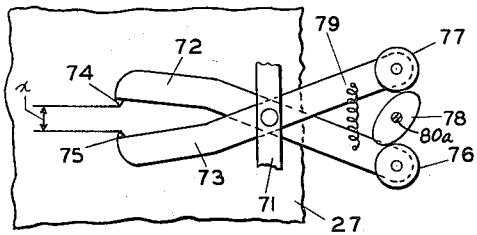
Fig. 11 is a top elevation similar to Fig. 9, but showing elements of the mechanism in a different position.
Figure 10:
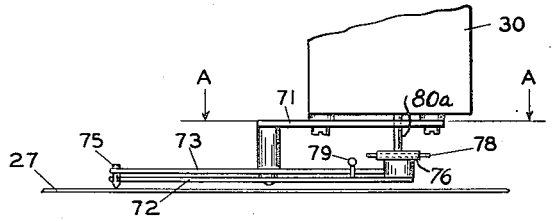

In Figs. 9, 10 and 11 is shown an alternative form of recording device whereby, instead of the significant parts of the record taking the form of a ripple superimposed upon the zigzag line drawn across the chart by the progressive movement of the carriage, cloudy or hazy strata in the atmosphere will be indicated at corresponding levels on the chart by a broadening of the record line. Supported from the lower portion of the recording unit 30, as by means of a bracket 71, is a scissors-like assembly comprising two crossed arms 72 and 73, pivoted about a common axis on said bracket whereby to swing in a limited angle in a plane substantially parallel to the recording surface of the chart 27. One pair of juxtaposed extremities of said arms is fitted with recording pens 74 and 75 adapted to be separately deflected with the arms 72 and 73, each making an independent graph on the surface of the chart, the two pens substantially coinciding when said arms are in their positions of closest proximity as indicated in Fig. 9. On the extremities of said arms remote from said pens are pivotally mounted small rollers 76 and 77 adapted to engage and function as follows to a suitably conformed cam 78 carried by the spindle of the recording unit 30. A tension spring 79 extended between suitable abutments on said arms serves to maintain the rollers 76 and 77 in intimate contact with the periphery of cam 78 thereby tending to maintain said cam and the attached spindle in angular positions corresponding to zero energization of the recording element, and to oppose deflection therefrom.

Figure 14:
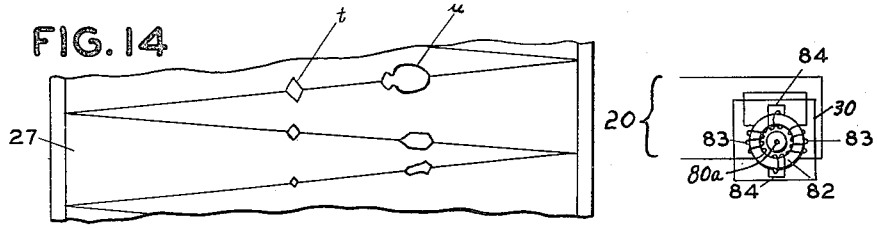
Figs. 14 and 15 are representations of typical charts obtained from instruments incorporating the form of the invention shown in Figs. 9, 10, and 11.

Instead of the recording unit being adapted to give an oscillatory response to alternating potential derived from the amplifier 19 (shown in Fig. 1), said unit is adapted for angular deflection in one sense only. This may be effected by any one of a number of well-known methods, of which that shown in Fig. 12 may be taken as an example. The active portion of the recording unit here takes the form of a direct current motor 80, similar to the motor shown in Fig. 5, and having a shaft or spindle $80a$ deflectable about its axis through a limited angle proportional to the magnitude of current flowing in the electrical circuit of said motor, said motor being energized through a rectifier 81, receiving its power from the conductors 20 which carry the output of said amplifier. In this manner, the motor 80 will exert a torque proportional to the average value of the amplifier output, which force, acting through the cam 78, will tend to separate the followers 76—77 in opposition to the influence of spring 79, thereby correspondingly separating the pens 74—75 on the surface of the chart through a distance $x$, as indicated in Fig. 11 said distance varying according to the degree of energization of the recording unit 30. The nature of the graph obtained from this form of recorder is shown in Fig. 14, the two pens normally coinciding to scribe a single transverse zigzag line on the chart, and separating as at $t$ and $u$ to produce figures with contours corresponding to the envelopes of the alternating impulses received from the amplifier 19.

Figure 15:
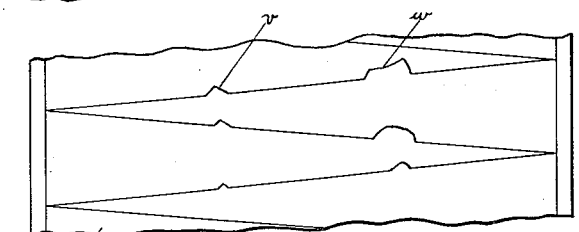

In Fig. 15 is shown a section of chart which may be obtained from the mechanism indicated in Figs. 9, 10 and 11, if one of the two pens be left inactive. If, for example, the pen 75 be removed, or left free of ink, the pen 74 only will produce a record, whereby, at locations corresponding to cloud heights, the zigzag line will be broken by a deflection to one side only, as at $v$ and $w$, which arrangement may at times be preferable where the characteristic record might otherwise tend to become congested.

Figure 12:
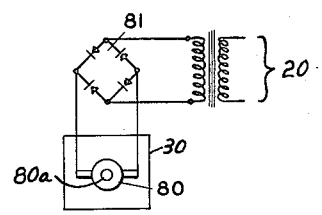
Figs. 12 and 13 are electrical diagrams showing two alternative methods of actuating the form of recording element illustrated in Figs. 9, 10, and 11.
Figure 13:
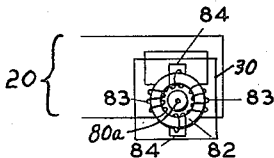

In Fig. 13 is shown an alternating current motor 82, which may, with an equivalent result, effectively replace the combination of direct current motor 80 and rectifier 85 shown in Fig. 12. The motor 82 is indicated as a conventional shaded-pole motor, having the usual exciting winding 83 and a pair of short-circuited shading coils 84, whereby, according to well-known principles, there will be developed in said motor a torque varying with the magnitude of alternating potential applied to the terminals of the exciting winding.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In apparatus for continuously recording the distance from a fixed point of an object having light-reflective properties, light-sensitive means, means for periodically operating said light-sensitive means to cause the latter to scan a region including said object at regularly recurring intervals of time, means for moving a chart at substantially constant speed, a recording device continuously cooperating with said chart to produce an uninterrupted record thereon, means controlled by said periodically operating means for driving said recording device across said chart in synchronism with the movement of said light-sensitive means to produce on said chart a graph having a component corresponding to the movement of said device across said chart, and movable means controlled by said light-sensitive means for operation through extents proportional to the intensity of light impulses of a given frequency reflected from said object, said movable means being mechanically connected to said recording device for shifting the latter in a direction substantially parallel to the surface of said chart to include in said graph a further component transverse to said first component and varying in magnitude with the intensity of said reflected impulses.

2. In apparatus for continuously recording the distance from a fixed point of an object having light-reflective properties, light-sensitive means, means for periodically operating said light-sensitive means to cause the latter to scan a region including said object at regularly recurring intervals of time, means for moving a chart at substantially constant speed, a carriage bearing a scribing member, means for moving said carriage transversely of said chart in synchronism with the movement of said light-sensitive means to cause said scribing member to produce on said chart a graph having a first component corresponding to said movement of said carriage, and movable means mounted upon said carriage and controlled by said light-sensitive means for movement through extents proportional to the intensity of light impulses reflected from said object, said movable means being mechanically connected to said scribing member for imparting thereto a motion in a sense substantially perpendicular to said component for superimposing on said graph a further component varying in extent with the intensity of said reflected impulses.

3. In apparatus for continuously recording the distance from a fixed point of an object having light-reflective properties, light-sensitive means, means for periodically operating said light-sensitive means to cause the latter to scan a region including said object at regularly recurring intervals of time, means for moving a chart at substantially constant speed, a carriage bearing a scribing member, means for moving said carriage transversely of said chart in synchronism with the movement of said light-sensitive means to cause said scribing member to produce on said chart a graph having a first component corresponding to said movement of said carriage, and movable means mounted on said carriage and controlled by said light-sensitive means for oscillatory movements corresponding with the frequency of light impulses reflected from said object and through extents proportional to the intensity of said impulses, said movable means being mechanically connected to said scribing member for imparting thereto a vibratory motion of said frequency and in a sense transverse to said component for superimposing upon said graph a further component alternating in nature and varying in extent with the intensity of said reflected impulses.

4. In apparatus for continuously recording the distance from a fixed point of an object having light-reflective properties, light-sensitive means, means for periodically operating said light-sensitive means to cause the latter to scan a region including said object at regularly recurring intervals of time, means for moving a chart at substantially constant speed, a carriage movable with respect to said chart, means for moving said carriage across said chart in synchronism with the movement of said light-sensitive means, said carriage bearing a pair of styli adapted for independent deflection in opposite senses, means normally maintaining said styli mutually juxtaposed to inscribe on said chart substantially a common graph representing the movement of said carriage, and movable means mounted on said carriage and controlled by said light-sensitive means for operation through extents proportional to the intensity of light impulses reflected from said object, and means actuated by said movable means for separating said styli to cause the latter to inscribe on said chart graphs separated to an extent representative of the intensity of said impulses.

5. In apparatus for continuously recording the distance from a fixed point of an object having light-reflective properties, photo-electric means, means for periodically operating said photo-electric means to cause the latter to scan a region including said object at regularly recurring intervals of time, means for moving a chart at substantially constant speed, a carriage bearing a scribing member, means for moving said carriage transversely of said chart in synchronism with the movement of said photo-electric means to cause said scribing member to produce on said chart a graph having a first component corresponding to said movement of said carriage, means on said carriage responsive to electric impulses controlled by said photo-electric means and of frequency and intensity corresponding to light impulses reflected from said object, said responsive means comprising an element movable from a neutral position in either direction depending upon the direction of said electric impulses and through extents proportional to the intensity thereof, said element being mechanically connected to said scribing member for imparting thereto a motion in a sense transverse to said component for superimposing on said graph a further component varying in extent with the intensity of said reflected impulses.

6. In apparatus for continuously recording the distance from a fixed point of an object having light-reflective properties, photo-electric means, means for periodically oscillating said photo-electric means to cause the latter to scan a region including said object at regularly recurring intervals of time, means for moving a chart at substantially constant speed, a carriage bearing a scribing member, means for reciprocating said carriage transversely of said chart in synchronism with the movement of said photo-electric means to cause said scribing member to produce on said chart a graph having a first component corresponding to said movement of said carriage, means on said carriage responsive to electric impulses controlled by said photo-electric means and of frequency and intensity corresponding to light impulses reflected from said object, said responsive means comprising an element movable from a neutral position in either direction depending upon the direction of said electric impulses and through extents proportional to the intensity thereof, said element being mechanically connected to said scribing member for imparting thereto a motion in a sense transverse to said component for superimposing on said graph a further component varying in extent with the intensity of said reflected impulses.

7. In apparatus for continuously recording the distance from a fixed point of an object having light-reflective properties through the production by a photo-electric scanning apparatus of electrical impulses corresponding in frequency and intensity with light impulses reflected from said object, means for moving a chart at substantially constant speed, a carriage bearing a scribing member, means for moving said carriage transversely of said chart in synchronism with the movement of said scanning means to cause said scribing member to produce on said chart a graph having a first component corresponding to said movement of said carriage, means on said carriage responsive to said electrical impulses and comprising an element movable through extents proportional to the intensity thereof, said element being mechanically connected to said scribing member to shift the latter transversely of said component to include in said graph a further component varying in extent with the intensity of said reflected light impulses.

8. In apparatus for continuously recording the distance from a fixed point of an object having light-reflective properties through the production by a photo-electric scanning apparatus of electrical impulses corresponding in frequency and intensity with light impulses reflected from said object, means for moving a chart at substantially constant speed, a carriage bearing a scribing member, means for moving said carriage transversely of said chart in synchronism with the movement of said scanning means to cause said scribing member to produce on said chart a graph having a first component corresponding to said movement of said carriage, electromagnetic means on said carriage controlled by said impulses and comprising an element movable through extents proportional to the intensity of said impulses, said element being mechanically connected to said scribing member to shift the latter transversely of said component to include in said graph a further component varying in extent with the intensity of said reflected light impulses.

9. In apparatus for continuously recording the distance from a fixed point of an object having light-reflective properties through the production by a photo-electric scanning apparatus of electrical impulses corresponding in frequency and intensity with light impulses reflected from said object, means for moving a chart at substantially constant speed, a carriage bearing a scribing member, means for moving said carriage transversely of said chart in synchronism with the movement of said scanning means to cause said scribing member to produce on said chart a graph having a first component corresponding to said movement of said carriage, piezo-electric means on said carriage controlled by said impulses and comprising an element movable through extents proportional to the intensity of said impulses, said element being mechanically connected to said scribing member to shift the latter transversely of said component to include in said graph a further component varying in extent with the intensity of said reflected light impulses.

10. In apparatus for continuously recording the distance from a fixed point of an object having light-reflective properties through the production by a photo-electric scanning apparatus of electrical impulses corresponding in frequency and intensity with light impulses reflected from said object, means for moving a chart at substantially constant speed, a carriage bearing a scribing member, means for moving said carriage transversely of said chart in synchronism with the movement of said scanning means to cause said scribing member to produce on said chart a graph having a first component corresponding to said movement of said carriage, electromagnetic means on said carriage controlled by said impulses and comprising an element rotatable in either direction from a neutral position through extents proportional to the intensity of said impulses, said element being mechanically connected to said scribing member to shift the latter transversely of said component to include in said graph a further component varying in extent with the intensity of said reflected light impulses.

11. In a distance-measuring system including a transmitter and a receiver relatively and cyclically angularly movable with respect to each other for producing a signal representative of the distance of an object, the strength of said signal being dependent upon the character of said object and other factors, the combination of a recorder provided with means for driving a record sheet in a predetermined direction, a stylus, structure supporting said stylus for movement between predetermined limits of said sheet, means for cyclically driving said stylus between said limits in timed relation with said relative movement between said transmitter and said receiver so that the position of said stylus is at all times related to the angular position between said transmitter and said receiver, said structure including a movable support for said stylus, and means responsive to the occurrence of said signal and to its magnitude for actuating said support to move said stylus to mark said record sheet, said mark having a position between said limits indicative of said angle and a length indicative of the magnitude of said signal.

CLINTON A. BLAKESLEE.
ABRAHAM WALTER JACOBSON.

References Cited in the file of this patent

UNITED STATES PATENTS

| Number | Name | Date |
|---|---|---|
| 1,613,520 | Marti | Jan. 4, 1927 |
| 1,854,640 | Binder | Apr. 19, 1932 |
| 2,202,935 | Weiss | June 4, 1940 |
| 2,216,716 | Withem | Oct. 1, 1940 |
| 2,234,329 | Wolff | Mar. 11, 1941 |
| 2,297,534 | Brulin | Sept. 29, 1942 |
| 2,351,081 | Swift | June 13, 1944 |
| 2,365,580 | Murcek | Dec. 19, 1944 |
| 2,504,126 | Howe | Apr. 18, 1950 |

FOREIGN PATENTS

| Number | Country | Date |
|---|---|---|
| 329,403 | Great Britain | May 27, 1930 |

OTHER REFERENCES

Electronic Industries, Sept. 1943, pages 90–92, 164, 166, 168, 170 and 172, "Measuring Cloud Heights."